United States Patent [19]

Chou

[11] Patent Number: 5,286,575

[45] Date of Patent: * Feb. 15, 1994

[54] BLENDS OF ETHYLENE VINYL ALCOHOL COPOLYMER AND POLYAMIDES, AND MULTILAYER CONTAINERS MADE THEREFROM

[75] Inventor: Richard T.-H. Chou, Wilmington, Del.

[73] Assignee: E. I. Du Pont de Nemours and Company, Wilmington, Del.

[ * ] Notice: The portion of the term of this patent subsequent to Feb. 5, 2008 has been disclaimed.

[21] Appl. No.: 893,996

[22] Filed: Jun. 5, 1992

Related U.S. Application Data

[63] Continuation-in-part of Ser. No. 554,776, Jul. 19, 1990, Pat. No. 5,126,401, which is a continuation-in-part of Ser. No. 301,473, Jan. 26, 1989, Pat. No. 4,990,562, which is a continuation-in-part of Ser. No. 88,261, Aug. 24, 1987, abandoned.

[51] Int. Cl.$^5$ .................. C08L 29/02; C08L 77/02
[52] U.S. Cl. ................... 428/474.4; 525/420; 525/58; 428/475.5
[58] Field of Search ............ 525/58, 420; 428/500, 428/475.5, 474.4

[56] References Cited

U.S. PATENT DOCUMENTS

| | | | |
|---|---|---|---|
| 3,726,945 | 4/1973 | Bottenbruch et al. | 260/857 L |
| 4,079,850 | 3/1978 | Suzuki et al. | 215/1 C |
| 4,427,825 | 1/1984 | Degrassi et al. | 525/56 |
| 4,500,677 | 2/1985 | Maruhashi et al. | 525/57 |
| 4,952,628 | 8/1990 | Blatz | 525/58 |
| 4,990,562 | 2/1991 | Chou et al. | 525/58 |
| 5,064,716 | 11/1991 | Chou et al. | 428/433 |
| 5,110,855 | 5/1992 | Blatz | 428/328 |
| 5,126,401 | 6/1992 | Chou | 525/58 |
| 5,126,402 | 6/1992 | Chou | 525/58 |

FOREIGN PATENT DOCUMENTS 53-49050  5/1978  Japan .................. C08L 23

OTHER PUBLICATIONS

U.S. patent application Ser. No. 07/301,473 filed Jan. 26, 1989 for this same inventor.

*Primary Examiner*—James J. Seidleck
*Assistant Examiner*—W. R. H. Clark

[57] ABSTRACT

The present invention is directed to a blend comprising about 5 to about 95 percent by weight of an ethylene vinyl alcohol copolymer and about 95 to about 5 percent by weight of an amorphous nylon polyamide copolymer having a glass transition temperature in the range of about 30 to 100° C. The polyamide forms separate domains when blended with the ethylene vinyl alcohol copolymer. Such a structure has been found to surprisingly provide a composition capable of stretching at temperatures less than about 110° C. without incurring problems known in the art.

7 Claims, No Drawings

BLENDS OF ETHYLENE VINYL ALCOHOL COPOLYMER AND POLYAMIDES, AND MULTILAYER CONTAINERS MADE THEREFROM

CROSS-REFERENCE TO RELATED APPLICATION

This is a continuation-in-part of copending U.S. Application No. 07/554,776, filed Jul. 19, 1990, now U.S. Pat. No. 5,126,401, is a continuation-in-part of copending U.S. Application No. 07/301,473, now U.S. Pat. No. 4,990,562 filed Jan. 26, 1989, which in turn is a continuation-in-part of U.S. Application No. 07/088,261, filed Aug. 24, 1987, now abandoned.

BACKGROUND OF THE INVENTION

This invention relates to blends of ethylene vinyl alcohol copolymer with an amorphous polyamide component and their use as a barrier layer in thermoformed multilayer containers or films as well as other applications.

Blends of ethylene vinyl alcohol polymers with polyamides in general are known, and have been used in packaging applications as barriers to inhibit the passage of atmospheric oxygen or other gases.

European patent application No. 0 305 146 discloses a blend of about 70 to about 95 percent by weight of an ethylene vinyl alcohol copolymer having a copolymerized ethylene content of about 20 to about 60 mole percent and a degree of saponification of at least about 90%, and about 5 to about 30 percent by weight of an amorphous polyamide. The composition is useful as a barrier layer in the thermoformed containers.

European patent application No. 0 309 095 discloses a blend of about 50 to about 95 weight percent of an amorphous polyamide and about 5 to about 50 weight percent of a vinyl alcohol polymer having a copolymerized ethylene content of 0 to about 60 mol percent and a degree of saponification of at least about 90%. The blends have oxygen barrier properties which are relatively independent of humidity. Packaging films, laminates, and containers prepared therefrom are disclosed.

U.S. Pat. Application No. 07/301,473 discloses a blend of ethylene vinyl alcohol copolymer and a polyamide blend of about 30 to about 90 percent by weight of at least one amorphous polyamide and about 10 to about 70 percent by weight of at least one semicrystalline polyamide which is miscible with the ethylene vinyl alcohol copolymer. The blends are useful for forming films, multiple layer structures, and formed structures prepared by stretching or thermoforming such multiple layer structures.

U.S. Pat. No. 3,726,034 discloses mixtures of 70–99% polyamide and up to 30% of a hydroxyl containing polyolefin. The polyamides "consist of linear unbranched polymer chains containing no additional functional groups." Exemplified are blends of nylon 6 and EVOH.

U.S. Pat. No. 4,079,850 discloses a multilayer blow molded container, which contains a layer which may be EVOH, polyamide, or various blends, providing gas barrier properties. The polyamides which are mentioned are nylon 6, nylon 66, and nylon 12.

U.S. Pat. No. 4,427,825 discloses a composition of matter useful for making films, of polyamide and 1–65% EVOH. Nylons with melting points greater than 175° C. are preferred, such as nylon 11 or nylon 12.

U.S. Pat. No. 4,500,677 discloses a resin composition comprising a mixture of two EVOH resins and a polyamide resin. The ratio of the EVOH resins to the nylon resin can be between 95:5 and 5:95. Nylon 6, nylon 6,6 and other polyamides having "linear alkylene group[s]" are specifically mentioned.

U.S. Pat. No. 5,064,716 discloses blends of a major portion of ethylene vinyl alcohol copolymer and a minor portion of an amorphous polyamide and preferably also a semicrystalline nylon. These blends may be formed into films or multilayer structures, which can be thermoformed into containers or other articles.

U.S. Patent Application (based on AD5897) discloses blends of ethylene vinyl alcohol copolymers and a mixture of an amorphous polyamide and a semicrystalline nylon. The polyamide mixture consists of 35 to 95 percent of at least one amorphous polyamide and about 5 to 65 percent of at least semicrystalline polyamide which has a methylene group/amide group ratio of about 5.5 to 7.5 and which forms separate domain when blended with ethylene vinyl alcohol.

EVOH is commonly used in the form of a thin layer together with thicker layers of less expensive structural materials, for example, polypropylene or polyethylene terephthalate, in order to form a structure which is resistant to the passage of atmospheric oxygen or other gases. To make containers of oriented, multilayer films, a solid phase thermoforming or a hot stretching (orientation) process is often used. However, EVOH generally cannot be formed at the relatively lower temperatures required for thermoforming or hot stretching of many common structural materials without rupturing the EVOH layer, resulting in a loss of overall barrier performance. Some of the above prior arts solve the problem under certain circumstances. However, multilayer EVOH structures exhibit relatively unattractive barrier properties after stretching at temperatures less than 110° C., which is a major economic and performance hurdle for practical applications. The present invention provides an EVOH blend composition which may be used in orienting or thermoforming EVOH multilayer structures at temperatures less than 110° C., while retaining the excellent barrier properties of EVOH.

BRIEF SUMMARY OF THE INVENTION

The present invention is directed to a blend comprising about 5 to about 95 percent by weight of an ethylene vinyl alcohol copolymer having a copolymerized ethylene content of about 20 to about 60 mole percent and a degree of saponification of at least about 90%, and about 95 to about 5 percent by weight of an amorphous nylon polyamide copolymer having a glass transition temperature in the range of about 30° to 100° C. The polyamide forms separate domains when blended with the ethylene vinyl alcohol copolymer. Such a structure has been found to suprisingly provide a composition capable of stretching at temperatures less than about 110° C. without incurring problems as described above. The present invention is also directed to films prepared of such blends and multiple layer structures, including a layer of such blend, or formed structures prepared by stretching or thermoforming such multiple layer structures. The invention also includes oriented multilayer shrink films which include at least one layer of such blends.

DETAILED DESCRIPTIONS OF THE PREFERRED EMBODIMENT

Materials and structures with barrier properties are important in many applications. Of particular interest are packaging materials which are barriers to the penetration of gases, such as oxygen, carbon dioxide, and various aromas.

In many packaging applications EVOH resins are used as relatively thin components of multilayer structures or containers. Usually the major parts of the structures are made of less expensive "structural" materials, bound to the EVOH layer by adhesive layers. The fabrication process in converting multilayer structures into final products often involves a mechanical deformation operation, such as orientation, thermoforming, or stretching in general, depending on the final form of the desired structure. However, EVOH generally exhibits very poor drawability, that is, the ability to be stretched or deformed uniformly at a temperature below its melting point. Quite often the stretching or deformation operation induces cracks, discontinuity or thinning ("necking") in the EVOH layer. As a result stretching or deformed multilayer structures which include a layer of EVOH resin often exhibit inferior barrier properties.

For the purposes of this invention, a deformation process includes any process for forming a shaped article (e.g., a film or a container) which (a) is distinct from the initial melt processing step and (b) which is performed at a temperature which is elevated above room temperature but lower than the melting point of the polymeric structural material. Casting of a film would not be a deformation process according to this definition because it is a melt processing step; vacuum-forming a film to prepare a container would be a deformation process. Making a film by a blown tubular process may or may not be a deformation process, depending on the temperature of the tubing or bubble at the location where blowing occurs. Examples of deformation processes include thermoforming (but excluding melt phase thermoforming), vacuum-forming, solid phase pressure forming, co-injection blow molding, co-injection stretch blow molding, tube extrusion followed by stretching, scrapless forming, forging, and tubular or flat sheet oriented film processes. Examples of articles that can be prepared using deformation processes are films and containers such as bottles, jars, cans, bowls, trays, dishes, pouches, oriented films, and shrink films. Deformation of polymeric materials is not only a way to attain such final shaped articles, but may also be a means to enhance barrier properties, mechanical properties, or even optical properties.

The temperature of the deformation step is usually determined by the "forming temperature" of the structural material, that is, the temperature at which it can be deformed. The forming temperature of a polymer is not readily related to any material properties of the polymer, except that it is normally higher than the $T_g$ of the polymer. In addition, this temperature is affected by the magnitude and rate of deformation of the particular process employed. The forming temperature of a given material for a given process can be readily determined by a person skilled in the art with a minimum of experimentation. Many structural materials have a lower forming temperature than that of EVOH, and it may be desirable for many reasons to conduct a molding operation at as low a temperature as possible. Furthermore, it may be desirable to reach an extent of deformation as high as possible. Thus the temperatures used for the deformation of such multilayer structures may be so low or the extent of deformation may be so high that the drawability of the EVOH layer is exceeded. As a consequence the desired deformed articles cannot be made without tearing or rupturing of the EVOH layer. The resulting discontinuities in the EVOH layer result in inferior oxygen barrier performance of the resulting article. An object of this invention is to provide a modified EVOH composition which may be used in deformed multilayer structures to avoid the above mentioned problems, and without substantially sacrificing the excellent gas barrier properties of EVOH. This modified composition is a blend of EVOH with amorphous polyamide copolymers.

The first component of the composition of the present invention is an ethylene vinyl alcohol copolymer. The EVOH resins useful in this invention include resins having a copolymerized ethylene content of about 20 to about 60 mole %, especially about 25 to about 50 mole %. Copolymers of lower than about 15 to 20 mole % ethylene tend to be difficult to extrude while those above about 60 or 65 mole % ethylene have reduced oxygen barrier performance. These polymers will have a saponification degree of at least about 90%, especially at least about 95%. A degree of saponification of less than about 90% generally results in inferior oxygen barrier properties. The ethylene vinyl alcohol copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on the total copolymer. The melting points of these ethylene vinyl alcohol polymers are generally between about 160° and 190° C.

Ethylene vinyl alcohol polymers are normally prepared by copolymerization of ethylene with vinyl acetate, followed by hydrolysis of the vinyl acetate component to give the vinyl alcohol group. This process is well known in the art.

The second component of the present invention is a polyamide. The polyamide component comprises about 5 to about 95 percent by weight of the total composition of EVOH plus polyamide, preferably about 10 to about 50 percent, and most preferably about 15 to about 35 percent.

The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute or in the alternative have only a very small amount of crystallinity (<3 cal/gm of polymer), since it is often difficult to determine when a crystalline polymer becomes non-crystalline and such a small amount of crystallinity will generally not adversely effect the performance of the present invention.

Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5- diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

Polyamides prepared from aliphatic diamines with aliphatic diacids are the traditional semicrystalline nylons (also referred to as crystalline nylons) and are not amorphous polyamides. Polyamides prepared from aromatic diamines and aromatic diacids are also known. However, certain of these all-aromatic polyamides are known to be intractable under ordinary melt processing conditions, and thus are not normally suitable. Thus the preferred amorphous polyamides are those in which either the diamine or the diacid moiety is aromatic, and the other moiety is aliphatic. The aliphatic groups of these polyamides preferably contain 6-12 carbon atoms in a chain or an aliphatic cyclic ring system having up to 15 carbon atoms. The aromatic groups of the polyamides preferably have mono or bicyclic aromatic rights which may contain aliphatic substituents of up to about 6 carbon atoms.

Specific examples of amorphous polyamides which are suitable for this invention include: copolymers of hexamethylenediamine isophthalamide, Nylon 6I, hexamethylenediamine adipamide, Nylon 66, having Nylon 6I/Nylon 66 mole ratios of 20/80 to 80/20, Copolymers of hexamethylenediamine isophthalamide, Nylon 6I, hexamethylenediamine sebacamide, Nylon 610, having Nylon 6I/Nylon 610 ratios of 20/80 to 80/20, hexamethylenediamine terephthalamide, Nylon 6T, hexamethylenediamine dodecanediamide, Nylon 612, having Nylon 6I/Nylon 612 mole ratios of 20/80 to 80/20. Polyamides of terpolymers involving more than two diacids or two diamines may also be suitable.

The above amorphous polyamides may contain as comonomers minor amounts of lactam species such as caprolactam or lauryl lactam, even though polymers based on these monomers alone are not amorphous. The important feature is that the polyamide as a whole must be amorphous. Thus small amounts of these comonomers may be incorporated as long as they do not impart crystallinity to the polyamide. In addition, up to about 10 weight % of a liquid or solid plasticizer such as glycerol, sorbitol, mannitol, or aromatic sulfonamide compounds (such as "Santicizer 8" from Monsanto) may be included with the amorphous polyamide.

For most applications the Tg of the amorphous polyamide (as measured in the dry state, i.e., containing about .12 weight % moisture or less) should be in the range of about 30° to 100° C., and preferably about 50° to 90° C. The lower limit on Tg is not clearly demarked and is not believed to be critical; 30° C. is an approximate lower limit, simply because a polyamide with a Tg less than 30° C. is difficult to be handled in manufacture. The upper limit on the Tg is about 100° C. However, not all polyamides having Tg in the range of 30° to 80° C. are suitable for the present invention. The suitable polyamides are those when blended with EVOH form a distinct two-phase mixture, one belonging to EVOH and the other polyamide as is evident with use of an electron microscope. The polyamides when blended with EVOH form a homogeneous mixture having poor forming characteristics, and even successful in thermoforming or stretching, the barrier properties of the resulting products having poorer barrier properties.

The blends of the present invention comprise about 5 to about 95 percent by weight EVOH and about 95 to about 5 percent by weight of a polyamide copolymer. When less than about 5% of the polyamide blend is used, the improvements in formability imparted by the invention are not fully realized. When more than about 95% of the polyamide is used, the oxygen barrier properties of the blend are degraded. Preferably such blends will contain about 65 to about 90 weight percent EVOH and about 35 to about 10 weight percent polyamide blend component. Of course, small amounts of other material such as other polymers, processing aids, antioxidants, fillers, pigments, etc. may be included in the blend without destroying the essence of this invention.

The blends of the present invention may be prepared by blending techniques well known in the art, including the use of single or twin screw melt processors or extruders. Blending is performed at temperatures sufficiently high to form a uniform melt of the components to be blended typically about 200° to about 230° C., above the melting points of the EVOH component.

The blends of the present invention may be formed into a film, which may be done by typical equipment such as extrusion casting or blown film lines, which may be uniaxially or biaxially oriented, if desired, by known techniques.

In addition, multiple layer structures which contain one or more layers of the blend of the present invention may be prepared. These structures may be incorporated into containers, which take advantage of the oxygen barrier properties of the blend of the present invention. In making multilayer containers, a structural layer will often be used, to provide structural support for the blend layer. The materials used for the structural layers may be made, for example, from any of a variety of structural polymers. Examples of such structural polymers include polyolefins such as polybutylene, polypropylene (either homopolymers or copolymers with ethylene), polyethylene homopolymer or co- or terpolymers of ethylene with other monomers such as vinyl acetate, carboxylic acids, such as acrylic acid, or methacrylic acid (with or without neutralization to form ionomers), polyethylene terephthalate or its copolymers, and polymers based on vinyl chloride or styrene, and the like.

The various layers of such multiple layer structures may be held together by any of a variety of adhesive resins. In general, such adhesive resins are thermoplastic polymers having carbonyl groups derived from functional groups of free carboxylic acids, carboxylic acid salts, carboxylic acid esters, carboxylic acid amides, carboxylic anhydrides, carbonic acid esters, urethanes, ureas or the like. In these thermoplastic polymers, the carbonyl group concentration may be changed in a broad range, but in general it is preferred to use a thermoplastic polymer containing carbonyl groups at a concentration of 10 to 1400 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, low density polyethylene and ethylene-vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides, and imides of the acids described above. The adhesive can also be prepared from an ethylene polymer and a second polymer grafted with maleic anhydride, as disclosed in U.S. Pat. No. 4,230,830, the disclosure of which is incorporated herein by reference. In addition, as the adhesive resin, there can be used ethyleneacrylate copolymers, ionomers, polyalkylene oxide-polyester block copolymers, carboxymethyl cellulose derivatives, and blends of these polymers with polyolefins.

It has been discovered that the blends of this invention can be used to make films and multiple layer structures which not only have excellent oxygen barrier properties, but also exhibit superior deformation characteristics even at a forming temperature of less than about 110° C. These structures can be deformed, stretched into biaxially oriented film, or thermoformed into shaped containers without occurrence of breaks or discontinuities in the EVOH blend layer, in contrast to the behavior of multilayer structures involving either EVOH by itself, or EVOH blended with crystalline polyamides. These structures, furthermore, can achieve a high degree of deformation, orientation, thermoforming, or stretching in any form, in a broad temperature range, in contrast to the behavior of either EVOH alone or EVOH blended with crystalline polyamide.

While not wishing to be bound by any particular theory, it is believed that certain of the improvements of the present invention can be partially understood by considering the microscopic structure of blends of EVOH with polyamides. Electron microscopy shows that blends of EVOH and the polyamides of the present invention form at least a two-phase system. The heterogeneous structure of such blends is important to attain good deformation capability and barrier properties.

EXAMPLES 1-8 AND COMPARATIVE EXAMPLES C1

Preparation of Blends

Blends of Examples 1-8 were prepared from 80 percent by weight ethylene vinyl alcohol copolymer and 20 percent by weight of a polyamide copolymer as shown in TABLE 1. Transmission electron microscopies of the blends of Samples 1-4 disclose that the polyamide is dispersed as a minor phase in EVOH matrix with the particle size range of 0.3 to 1.5 micron meter. (The transmission electron microscopies of thin sections of the blends, 90-120 nanometer, were obtained by using a Zeiss EM10CR TEM).

In Examples 1-4 the EVOH contains 44 mole % ethylene and has a melt flow index of 12, as measured at 210° C. with 2160 g weight (ASTM D-1238). For Examples 5-8, the EVOH contains 32 mole % ethylene and has a melt flow of 3, as measured at 210° C. with 2160 g weight (ASTM D-1238). For Comparative Example, the EVOH is the same as described in Examples 5-8.

For Example 1, an amorphous polyamide was used, the condensation copolymer of hexamethylenediamine isophthalamide, Nylon 6I (60 mole %), and hexamethylenediamine sebacamide, Nylon 610 (40 mole %), having a glass transition temperature of 86° C. (ASTM D-3418) and an inherent viscosity of 0.98. (Inherent viscosity of the polyamide is determined by dissolving the polymer in hot m-cresol followed by viscosity measurement using a Schott Autoviscometer). It was prepared in an autoclave of 100 gallon size. The salt of hexamethylenediamine isophthalamide, Nylon 6I, and the salt of hexamethylenediamine sebacamide, Nylon 610, each prepared separately, were mixed together in a fixed ratio, adjusting the PH of the salt solution to about 8-9. Very minor amounts of e.g., wax, inorganic acid catalyst, and antifoaming agent may also be added at this point. The composition thus prepared is polymerized and completed at 265° C. This polyamide is designated in Table 1 as "APA1".

For Example 2, an amorphous polyamide copolymer of Nylon 6I and Nylon 610 with a mole ratio of 70/30 mole percent, having a glass transition temperature of 94° C. and an inherent viscosity of 0.95. This polyamide was prepared as described for APA1 and is designated in Table 1 as "APA2". For Example 3, an amorphous polyamide copolymer of Nylon 6I and Nylon 610 with a mole ratio of 45/55, having a glass transition temperature of 70° C. and an inherent viscosity of 0.91. This polyamide was prepared as described for APA1 and id designated in Table 1 as "APA3". For Example 4, an amorphous polyamide copolymer of hexamethylenediamine isophthalamide, Nylon 6I (55 mole %) and hexamethylenediamine adipamide, Nylon 66 (45 mole %), having a glass transition temperature of 86° C. and an inherent viscosity of 1.0. This polyamide was prepared as described for APA1 and is designated in Table 1 as "APA4". The polyamide copolymers employed in Examples 5-8 were described above and as indicated in Table 1.

Preparation of Multilayer Structures

Next, samples of the blends and the comparative sample were coextruded into 0.5 to 0.6 mm multilayer sheet samples. Three single screw extruders, a combining adapter, and a 35 cm wide single manifold sheeting die were used. The two surface layers, copolymers of ethylene and vinylacetate with a melt flow index of 2 and a melting point of 97° C., and each about 0.2 to 0.3 mm thick, were extruded on a 38 mm single screw extruder, L/D=24, turning at 75 RPM, at a melt temperature of 220° C. Two adhesive layers 0.02 to 0.04 mm thick, a maleic anhydride grafted ethylene vinyl acetate copolymer, with a melt flow index of 2.0 and melting point of 80° C., were extruded on a 32 mm single screw extruder, L/D=24, at a melt temperature of 215° C. The core layers (blends or EVOH) of the multilayer structures, 0.03 to 0.06 mm thick, were extruded on a 25 mm single screw extruder, L/D=24, equipped with a grooved feed section, with a melt temperature of 220° C. The thicknesses of the barrier layer and the overall sheet are reported in Table 1 (presented in the format of barrier thickness/overall thickness). The casting rolls were cooled with water having a temperature of 60° C. Thereafter the multilayer structures were biaxially oriented with a film stretcher (manufactured by T. M. Long Co.) under the conditions indicated in Table 1. The drawing was simultaneously in the machine and transverse directions, at 6000% per minute. Haze of the films was measured according to ASTM D-1003. The quality of the films was also visually evaluated and rated on a scale of A-D, where A indicates a uniformly drawn film with good transparency, B indicates uniform drawing, but slight haze, C indicates noticeable irregularity in drawing in barrier layer, and D indicates failure in drawing. The films based on Comparative Example 1 exhibits clear uneven stretching line, and at higher stretching ratio it failed to be stretched. The oxygen transmission rate, OTR (in mL/meter square-24 hours-atmosphere at 30° C.) of the oriented film was measured at a 100% humidity according to ASTM D-3985. The 100% humidity was achieved by sandwiching the testing film with two wet pads (water saturated filter papers) and conditioned for three weeks before testing.

TABLE 1

| A | B Composition | C Thickness (mm) | D Stretch Condition Ratio, Temp. | E Oriented film Thick, mm | F Haze (%) | G Quality | H OTR |
|---|---|---|---|---|---|---|---|
| Example 1 | EVOH/APA1 | .058/.53 | 3 × 3, 90° C. | 0.064 | 9 | A | 108.0 |
|  |  |  | 3 × 4, 100° C. | 0.051 | 13 | B | 106.3 |
| Example 2 | EVOH/APA2 | .056/.56 | 3 × 3, 90° C. | 0.056 | 14 | B | 108.5 |
|  |  |  | 3 × 4, 100° C. |  |  | D |  |
| Example 3 | EVOH/APA3 | .064/.55 | 3 × 3, 90° C. | 0.066 | 5 | A | 116.3 |
|  |  |  | 3 × 4, 100° C. | 0.046 | 4 | A | 138.8 |
| Example 4 | EVOH/APA4 | .056/.57 | 3 × 3, 90° C. | 0.076 | 11 | B | 112.7 |
|  |  |  | 3 × 4, 100° C. | 0.041 | 10 | B | 119.6 |
| Example 5 | EVOH/APA1 | .033/.5 | 3 × 3, 90° C. | 0.058 | 8 | A | 286.8 |
|  |  |  | 3 × 4, 100° C. |  |  | D |  |
| Example 6 | EVOH/APA2 | .036/.51 | 3 × 3, 90° C. | 0.061 | 11 | A | 322.4 |
|  |  |  | 3 × 4, 100° C. |  |  | D |  |
| Example 7 | EVOH/APA3 | .03/.50 | 3 × 3, 90° C. | 0.061 | 5 | A | 378.2 |
|  |  |  | 3 × 4, 100° C. | 0.041 | 3 | D |  |
| Example 8 | EVOH/APA4 | .03/.50 | 3 × 3, 90° C. | 0.056 | 6 | A | 502.2 |
|  |  |  | 3 × 4, 100° C. | 0.046 | 7 | A |  |
| Comparative Example 1 | EVOH | .058/.55 | 3 × 3, 90° C. | 0.071 | 6 | C | 99.8 |
|  |  |  | 3 × 4, 100° C. |  |  | D |  |

What is claimed is:

1. A blend comprising:
   (a) about 5 to about 95 percent by weight of an ethylene vinyl alcohol copolymer ("EVOH") having a copolymerized ethylene content of about 20 to about 60 mole percent and a degree of saponification of at least about 90%, and
   (b) about 95 to about 5 percent by weight of a amorphous polyamide having a glass transition temperature in the range of about 80° to 100° C.,
   wherein the resulting blend provides separate domains of EVOH and polyamide.

2. The blend of claim 1 wherein the ethylene vinyl alcohol copolymer is present at about 30 to about 85 percent by weight and the polyamide blend is present at about 15 to about 70 percent by weight.

3. The blend of claim 1 wherein the ethylene vinyl alcohol copolymer contains about 25 to about 50 mole percent copolymerized ethylene.

4. The blend of claim 3 wherein the ethylene vinyl alcohol copolymer has a degree of saponification of at least about 95 percent.

5. A film prepared from the blend of claim 1.

6. A film prepared from the blend of claim 3.

7. A multiple layer structure wherein at least one of the layers is prepared from the blend of claim 1.

* * * * *